United States Patent
Watanabe

(10) Patent No.: US 12,435,725 B2
(45) Date of Patent: Oct. 7, 2025

(54) PUMP MONITORING DEVICE AND VACUUM PUMP

(71) Applicant: SHIMADZU CORPORATION, Kyoto (JP)

(72) Inventor: Kota Watanabe, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 362 days.

(21) Appl. No.: 16/458,041

(22) Filed: Jun. 29, 2019

(65) Prior Publication Data

US 2020/0080564 A1   Mar. 12, 2020

(30) Foreign Application Priority Data

Sep. 7, 2018 (JP) ................. 2018-168194

(51) Int. Cl.
| | | |
|---|---|---|
| *F04D 25/06* | (2006.01) | |
| *F04D 27/00* | (2006.01) | |
| *G01M 13/00* | (2019.01) | |

(52) U.S. Cl.
CPC .......... *F04D 25/06* (2013.01); *F04D 27/001* (2013.01); *G01M 13/00* (2013.01); *F05D 2260/80* (2013.01); *F05D 2270/335* (2013.01)

(58) Field of Classification Search
CPC ........ F04D 25/06; F04D 27/00; F04D 27/001; F04D 19/042; F04D 15/02; F04D 15/0077; F04D 15/0088; F04D 15/0254; F04C 28/28; F04C 29/00; F04C 14/28; G01M 13/00; F05D 2260/08; F05D 2270/335
See application file for complete search history.

(56) References Cited

U.S. PATENT DOCUMENTS 5,269,289 A * 12/1993 Takehana ............. A61B 1/0655
                                                                   348/E9.053
9,494,932 B2   11/2016 Kawai
10,415,577 B2   9/2019 Tsubokawa
(Continued)

FOREIGN PATENT DOCUMENTS

CN    104583887 A      4/2015
CN    107795498 A  *   3/2018  ............. F04D 17/12
(Continued)

OTHER PUBLICATIONS

Region Definition & Meaning—Merriam-Webster pdf, from merriam-webster.com/dictionary/region (Year: 2023).*
(Continued)

*Primary Examiner* — David N Brandt
(74) *Attorney, Agent, or Firm* — Renner, Otto, Boisselle & Sklar, LLP

(57) ABSTRACT

A pump monitoring device of a vacuum pump for performing exhaust for a process chamber in which various processes are performed for a processing target, comprises: an acquisition section configured to acquire a physical amount representing an operation state of the vacuum pump; a comparison section configured to compare an actual measurement waveform of the physical amount with a reference waveform of the physical amount; and a determination section configured to determine an abnormality due to an increase in a load of the vacuum pump based on a comparison result of the comparison section.

9 Claims, 9 Drawing Sheets

(56) References Cited

U.S. PATENT DOCUMENTS

| | | | |
|---|---|---|---|
| 2008/0208385 A1* | 8/2008 | Sakamoto | G05B 23/0235 |
| | | | 700/121 |
| 2014/0030091 A1* | 1/2014 | Wu | F04D 27/004 |
| | | | 416/61 |
| 2016/0218026 A1* | 7/2016 | Kobayashi | H01L 21/67253 |
| 2016/0339200 A1* | 11/2016 | Bath | A61M 16/0051 |
| 2018/0066669 A1* | 3/2018 | Tsubokawa | G01R 31/343 |
| 2018/0158314 A1* | 6/2018 | Larsson | G08B 31/00 |
| 2018/0260656 A1* | 9/2018 | Ohkubo | G06F 17/18 |
| 2019/0005433 A1* | 1/2019 | Sekine | G05B 23/0235 |
| 2019/0353563 A1* | 11/2019 | Nishino | G05B 23/02 |
| 2022/0155220 A1* | 5/2022 | Suzuki | G01N 21/31 |

FOREIGN PATENT DOCUMENTS

| | | |
|---|---|---|
| JP | 2004-184141 A | 7/2004 |
| JP | 2006161677 A | 6/2006 |
| JP | 2012-16508 A | 1/2012 |
| JP | 5767632 B | 6/2015 |
| JP | 2018040277 A | 3/2018 |
| WO | 2011145444 A1 | 11/2011 |
| WO | 2013161399 A1 | 10/2013 |

OTHER PUBLICATIONS

Office Action for corresponding CN Application No. 201910680699.3 dated Aug. 4, 2020, with English language translation.

Office Action for corresponding JP Application No. 2018-168194 dated Nov. 25, 2021, with English language translation.

Office Action for corresponding JP Application No. 2018-168194 dated May 9, 2022, with English language translation.

Decision of Refusal for corresponding JP Application No. 2018-168194 dated Sep. 14, 2022, with English language translation.

Decision of Dismissal of Amendment for corresponding JP Application No. 2018-168194 dated Sep. 14, 2022, with English language translation.

Office Action for corresponding JP Application No. 2022-198708 dated Aug. 30, 2023, with English machine translation.

\* cited by examiner

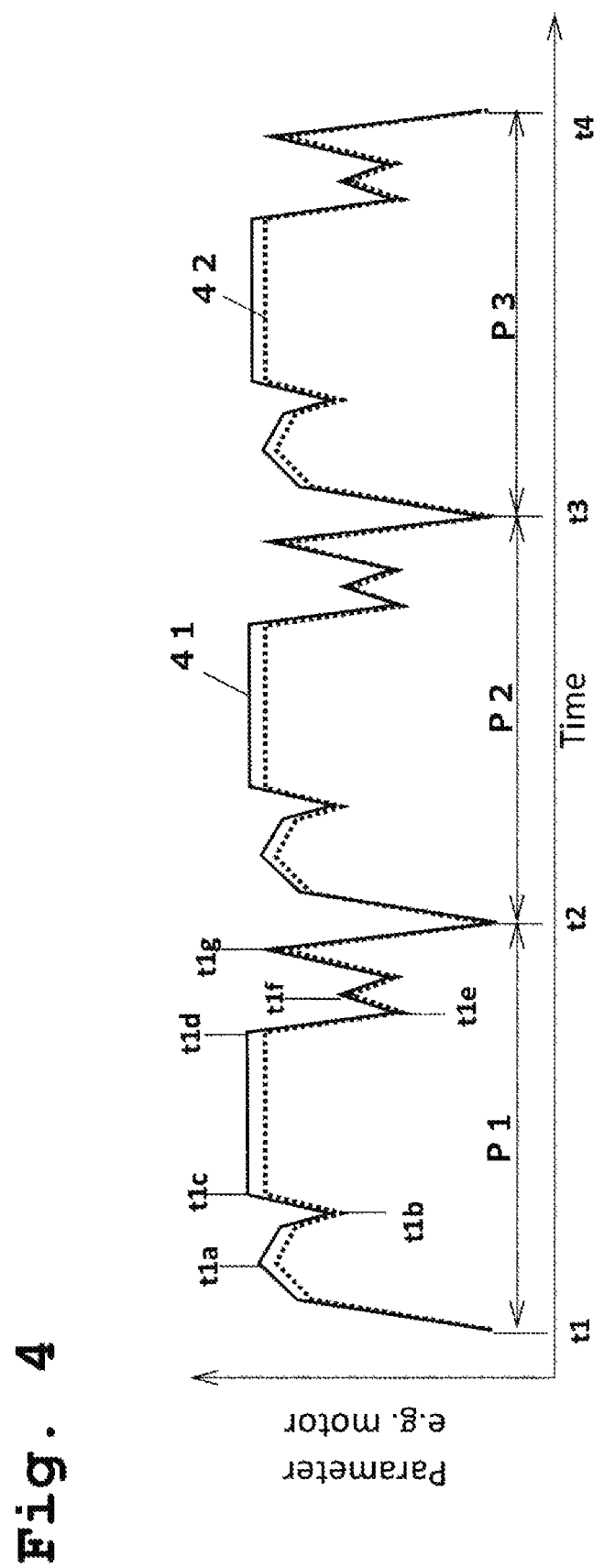

PUMP MONITORING DEVICE AND VACUUM PUMP

BACKGROUND OF THE INVENTION

1. Technical Field

The present invention relates to a pump monitoring device and a vacuum pump equipped with the pump monitoring device.

2. Background Art

At a step such as dry etching or CVD in manufacturing of a semiconductor or a liquid crystal panel, gas in a high-vacuum process chamber is, for performing processing in the process chamber, discharged by a vacuum pump such as a turbo-molecular pump to maintain a high-vacuum state, for example. In the case of discharging gas from the process chamber in, e.g., dry etching or CVD, a reactive product is accumulated in the pump in association with gas exhaust.

Regarding such accumulation of the reactive product, Patent Literature 1 (JP 5767632) discloses the method for sensing a product accumulated in a pump. In the accumulated material sensing method disclosed in Patent Literature 1, a current value of a motor configured to rotatably drive a rotary body of the pump is measured, and an alert is issued in a case where the amount of change in a measurement value with respect to an initial motor current value is equal to or greater than a predetermined value.

However, the flow rate of gas to be discharged actually greatly fluctuates even in a single process, and therefore, the current value of the motor configured to rotatably drive the rotary body also greatly fluctuates in association with fluctuation in the gas flow rate. For this reason, erroneous determination cannot be avoided.

SUMMARY OF THE INVENTION

A pump monitoring device of a vacuum pump for performing exhaust for a process chamber in which various processes are performed for a processing target, comprises: an acquisition section configured to acquire a physical amount representing an operation state of the vacuum pump; a comparison section configured to compare an actual measurement waveform of the physical amount with a reference waveform of the physical amount; and a determination section configured to determine an abnormality due to an increase in a load of the vacuum pump based on a comparison result of the comparison section.

The comparison section compares the reference waveform selected for each process with the actual measurement waveform.

The reference waveform is acquired based on a signal waveform of the physical amount within a predetermined period after the vacuum pump has been started.

The comparison section calculates, for each of the actual measurement waveform and the reference waveform within a duration in which the physical amount is maximum in a single process, an average of the physical amount for the actual measurement waveform and the reference waveform, and computes a difference between the averages to perform waveform comparison.

A signal waveform of the physical amount obtained when an identical process is continuously performed for multiple processing targets is defined as a unit waveform, each of the reference waveform and the actual measurement waveform includes multiple unit waveforms repeated within a predetermined period, and the comparison section compares the reference waveform and the actual measurement waveform each including the multiple unit waveforms.

The physical amount is a current value of a motor configured to rotatably drive a rotor of the vacuum pump.

A vacuum pump comprises: a pump main body including a rotor, a stator, and a motor configured to rotatably drive the rotor; and a pump controller including the pump monitoring device and configured to drivably control the motor.

According to the present invention, the abnormality of the load of the vacuum pump due to the process in the process chamber, such as an abnormality caused by a pump load increase due to an accumulated impurity product, can be accurately determined.

BRIEF DESCRIPTION OF THE DRAWINGS

FIG. 4 is a graph of an actual measurement waveform and a reference waveform of a motor current value;

DETAILED DESCRIPTION OF THE EXEMPLARY EMBODIMENTS

Hereinafter, embodiments of the present invention will be described with reference to the drawings.

First Embodiment

Figure 1:
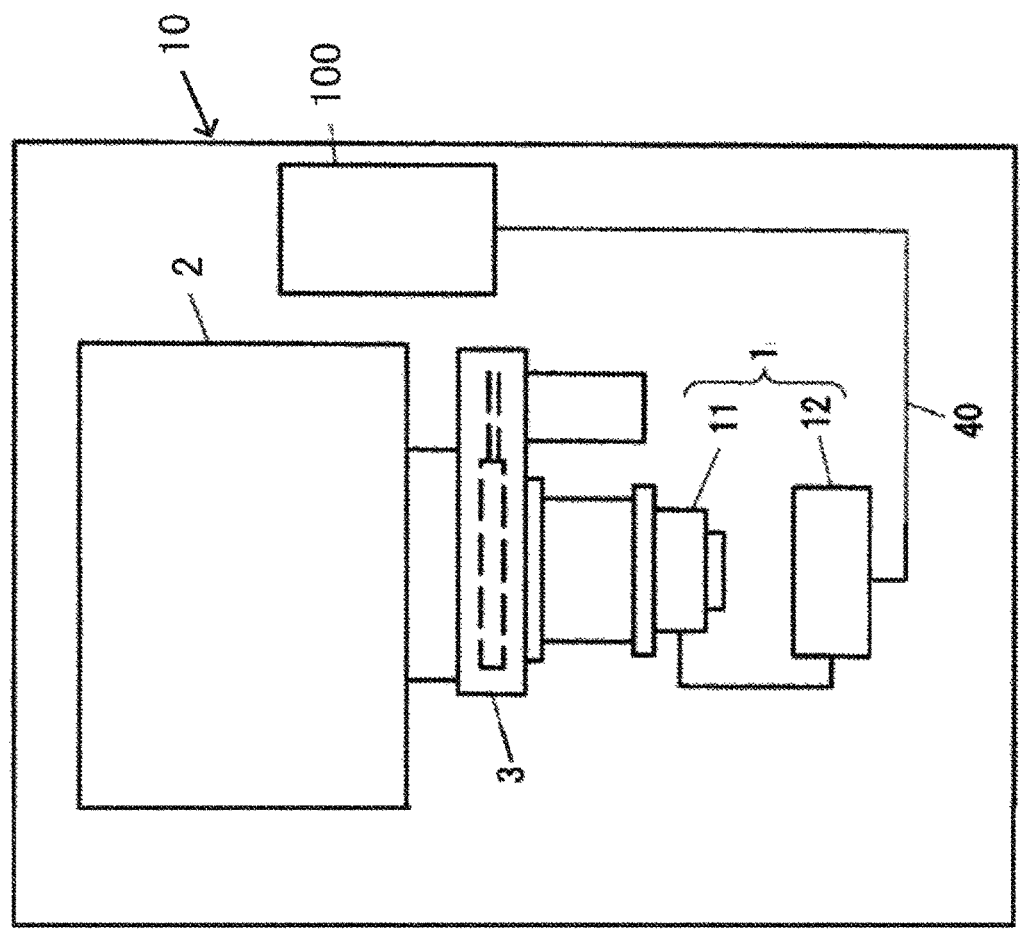
FIG. 1 is a view of a vacuum processing device in a first embodiment.

FIG. 1 is a view of a vacuum processing device 10 equipped with a pump monitoring device in a first embodiment. The vacuum processing device 10 is, for example, a device for etching processing or film formation. A vacuum pump 1 is attached to a process chamber 2 through a valve 3. The vacuum processing device 10 includes a main controller 100 configured to control the entirety of the vacuum processing device 10 including the vacuum pump 1 and the valve 3. The vacuum pump 1 includes a pump main body 11 and a pump controller 12 configured to drivably control the pump main body 11. The pump controller 12 of the vacuum pump 1 is connected to the main controller 100 through a communication line 40. As described later, the pump controller 12 includes a pump monitoring section 24 configured to monitor whether or not the vacuum pump 1 is abnormal, and therefore, monitors the abnormality of the vacuum pump 1. A pump abnormality in the present specification is caused due to adherence of a product to, e.g., a pump rotor, the product being generated by gas flowing into the pump from the process chamber (FIG. 2).

Figure 2:
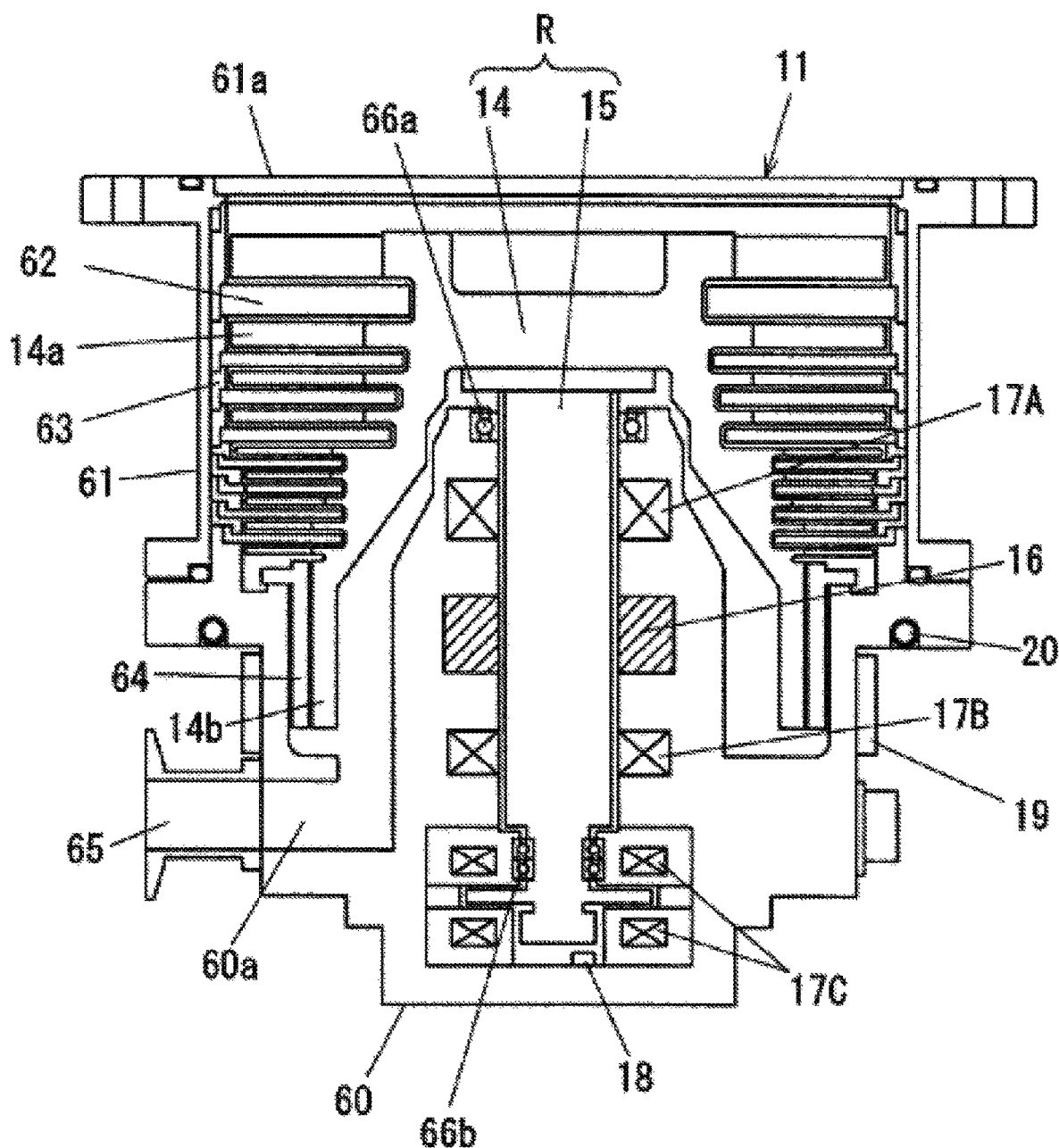
FIG. 2 is a sectional view of details of a pump main body.

FIG. 2 is a sectional view of details of the pump main body 11. The vacuum pump 1 in the present embodiment is a magnetic bearing turbo-molecular pump, and a rotary body R is provided at the pump main body 11. The rotary body R includes a pump rotor 14 and a rotor shaft 15 fastened to the pump rotor 14.

At the pump rotor 14, multiple stages of rotor blades 14a are formed on an upstream side, and a cylindrical portion 14b forming a screw groove pump is formed on a downstream side. On a stationary side, multiple stationary blade stators 62 and a cylindrical screw stator 64 are provided corresponding to the components described above. There are a form in which a screw groove is formed at an inner peripheral surface of the screw stator 64 and a form in which a screw groove is formed at an outer peripheral surface of the cylindrical portion 14b. Each stationary blade stator 62 is mounted on a base 60 through a spacer ring 63.

The rotor shaft 15 is magnetically levitated and supported by radial magnetic bearings 17A, 17B and an axial magnetic bearing 17C provided at the base 60, and is rotatably driven by a motor 16. Each of the magnetic bearings 17A to 17C includes an electromagnet and a displacement sensor, and a levitation position of the rotor shaft 15 is detected by the displacement sensor. The number of rotations of the rotor shaft 15 is detected by a rotation number sensor 18. In a case where the magnetic bearings 17A to 17C are not in operation, the rotor shaft 15 is supported by emergency mechanical bearings 66a, 66b.

A pump case 61 provided with a suction port 61a is bolted to the base 60. An exhaust port 65 is provided at an exhaust outlet 60a of the base 60, and a back pump is connected to the exhaust port 65. When the rotor shaft 15 fastened to the pump rotor 14 is rotated at high speed by the motor 16, gas molecules on a suction port 61a side are discharged to an exhaust port 65 side.

A heater 19 and a refrigerant pipe 20 in which refrigerant such as coolant water flows are provided at the base 60. A not-shown refrigerant supply pipe is connected to the refrigerant pipe 20, and the flow rate of refrigerant to the refrigerant pipe 20 can be adjusted by opening/closing control of an electromagnetic on-off valve placed at the refrigerant supply pipe. In a case where gas easily leading to accumulation of a reactive product is discharged, ON/OFF of the heater 19 and ON/OFF of the flow rate of refrigerant flowing in the refrigerant pipe 20 are, for reducing product accumulation on a screw groove pump portion or the rotor blades 14a on the downstream side, performed to adjust a temperature such that a base temperature in the vicinity of a screw stator fixing portion reaches a predetermined temperature, for example.

Figure 3A:
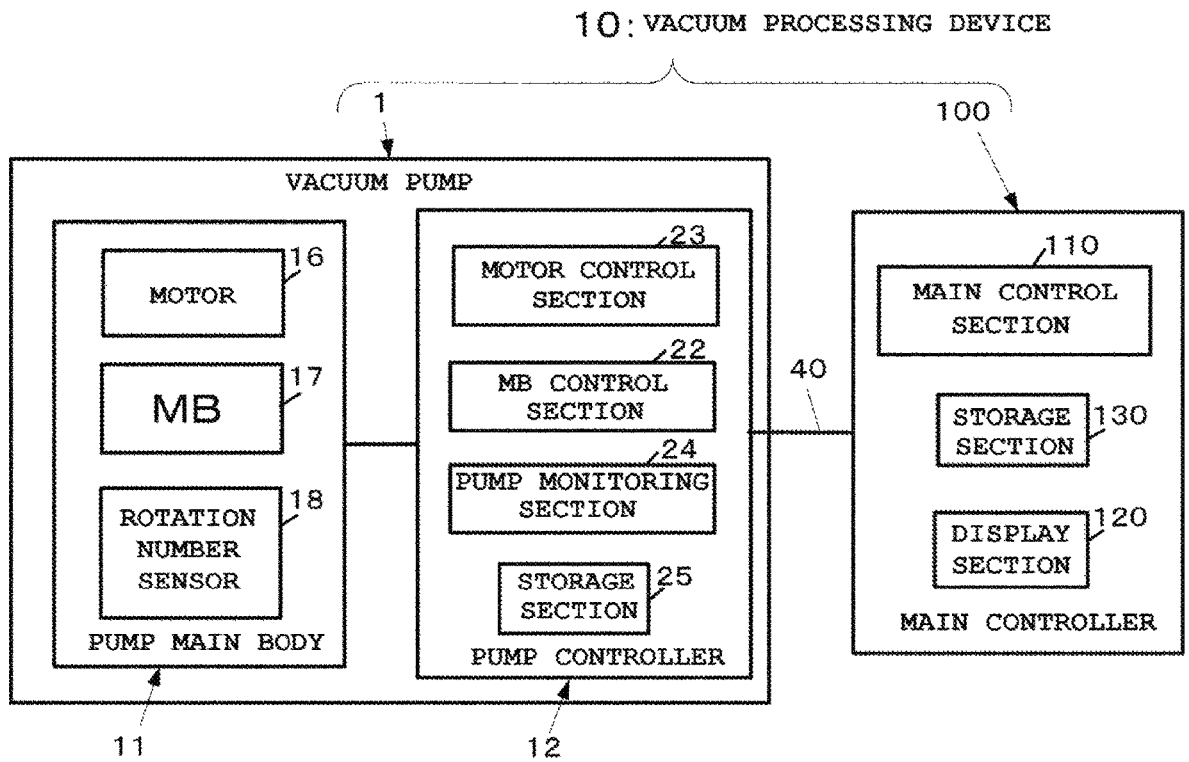
FIG. 3A is a block diagram of a vacuum pump and a pump monitoring device.
Figure 3B:
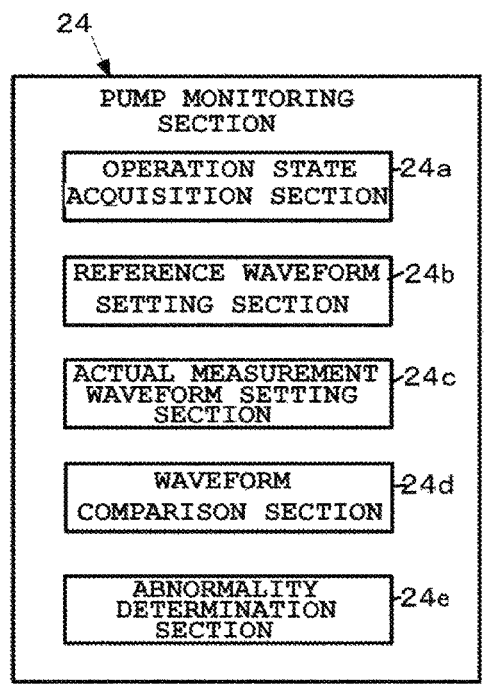
FIG. 3B is a functional block diagram of the pump monitoring section.

FIGS. 3A and 3B are block diagrams of a configuration of the vacuum pump 1 provided at the vacuum processing device 10 and a configuration of the main controller 100. As also illustrated in FIG. 2, the pump main body 11 of the vacuum pump 1 includes the motor 16, the magnetic bearings (MBs) 17, and the rotation number sensor 18. The pump controller 12 includes a motor control section 23, a magnetic bearing control section (a MB control section) 22, the pump monitoring section 24, and a storage section 25. The pump controller 12 is composed by a computer such as a personal computer, a CPU or a FPGA etc. Note that in FIGS. 3A and 3B, the radial magnetic bearings 17A, 17B and the axial magnetic bearing 17C of FIG. 2 will be collectively referred to as "magnetic bearings 17."

The main controller 100 includes a main control section 110, a display section 120, and a storage section 130.

The motor control section 23 estimates the number of rotations of the rotor shaft 15 based on a rotation signal detected by the rotation number sensor 18, thereby controlling the motor 16 to a predetermined target rotation number based on the estimated number of rotations. As a gas flow rate increases, a load on the pump rotor 14 increases. Thus, the number of rotations of the motor 16 decreases. The motor control section 23 controls a motor current such that a difference between the number of rotations detected by the rotation number sensor 18 and the predetermined target rotation number reaches zero, thereby maintaining the predetermined target rotation number (a rated rotation number).

The magnetic bearing 17 includes the bearing electromagnet and the displacement sensor configured to detect the levitation position of the rotor shaft 15.

As described above, the pump monitoring section 24 provided at the pump controller 12 is a device configured to monitor whether or not the abnormality is caused at the vacuum pump 1 attached to the process chamber 2. In the first embodiment, a state in which the vacuum pump 1 cannot be normally operated due to excessive reactive product accumulation is specifically defined as a pump abnormal state. For preventing the pump abnormal state in advance, occurrence of the pump abnormality is predicted at a point sufficiently before occurrence of the pump abnormal state. Note that the point at which the pump abnormality is predicted will be referred to as "pump abnormality detection."

Referring to FIG. 3B, the pump monitoring section 24 includes an acquisition section 24a configured to acquire a physical amount representing an operation state of the vacuum pump 1, such as a motor current value, setting sections 24b, 24c configured to set an actual measurement waveform and a reference waveform of the motor current value, a comparison section 24d configured to compare the set actual measurement waveform and the set reference waveform, and a determination section 24e configured to perform abnormality determination based on the load of the vacuum pump 1 based on a comparison result of the comparison section 24d. These functions are implemented by that the computer performs the software program installed in the storage section 25 as described in detail with reference to FIGS. 5 to 7.

The pump controller 12 of the vacuum pump 1 and the main controller 100 exchange information via the communication line 40. The communication line 40 exchanges, for example, a signal via serial communication.

(Description of Monitoring Method)

The pump monitoring section 24 uses, as information for detecting the abnormality of the vacuum pump 1, a signal indicating a rotation state of the pump rotor 14. In the present embodiment, a case where the motor current value of the vacuum pump 1 is used as the signal indicating the rotation state of the pump rotor 14 will be described.

In the motor control section 23 of the pump controller 12, the rotation speed of the motor 16 is calculated based on a detection value of the rotation number sensor 18, and feedback control is performed such that the detected rotation speed reaches a target rotation speed. In a state in which a series of process is performed, the motor control section 23 performs the steady operation control of maintaining the rotation speed at a rated rotation speed. For example, when gas is injected into the process chamber 2, the load on the pump rotor 14 increases. The motor control section 23 performs the control of maintaining the motor rotation speed at the rated rotation speed, and therefore, the motor current value increases with an increase in a gas load. Conversely, the motor current value decreases with a decrease in the gas load.

The motor current value of the vacuum pump 1 acquired by the motor control section 23 is input to the pump monitoring section 24. The pump monitoring section 24 computes the degree of coincidence between the waveform of the motor current value and the pre-acquired reference waveform. The pump monitoring section 24 determines as the pump abnormal state when the degree of coincidence is low, and determines as a pump normal state when the degree of coincidence is high.

FIG. 4 is a graph of one example of a time-series waveform of the motor current value in the same vacuum processing process, such as a continuous repeated etching process for multiple substrates, in the vacuum processing device 10. Specifically, FIG. 4 illustrates the time-series waveform of the motor current value in a process P1 for a first substrate, a process P2 for a second substrate, and a process P3 for a third substrate, the same process being continuously performed in these processes. A solid line 41 of each waveform indicates the actual measurement motor current value waveform (hereinafter referred to as an "actual measurement waveform"), and a dashed line 42 indicates the reference motor current value waveform (hereinafter referred to as a "reference waveform").

In FIG. 4, the process P1 for the first substrate is performed between time points t1 to t2, the process P2 for the second substrate is performed between the time points t2 to t3, and the process P3 for the third substrate is performed between the time points t3 to t4. As illustrated in FIG. 4, the processes P1 to P3 are executed at equal time intervals (equal intervals), and the substantially same actual measurement waveform 41 is provided.

At the time point t1, when exhaust is performed such that the pressure of the process chamber 2 into which the first substrate has been carried changes toward a high vacuum, the motor current value rapidly increases, and reaches the maximum value at a time point t1a. Then, the motor current value decreases to a time point t1b. Thereafter, process gas is injected from the time point t1b, and the motor current value increases and reaches the maximum value at a time point t1c. The process is performed under a constant vacuum pressure from the time point t1c to a time point t1d, and therefore, a constant motor current value is provided. The process for the first substrate ends at the time point t1d, and injection of the process gas is stopped. The motor current value rapidly decreases, and decreases to a time point t1e. Thereafter, two peaks at time points t1f, t1g are shown, and the motor current value rapidly decreases from the peak at the time point t1g to the time point t2. Meanwhile, the first substrate is carried out, and the second substrate is carried in. In the process P2 starting from the time point t2 for the second substrate and the process P3 starting from the time point t3 for the third substrate, motor current value fluctuation similar to that of the process P1 is shown.

In the pump monitoring section 24 of the first embodiment, the process begins after the vacuum pump 1 has been started to bring the number of rotations to the rated rotation number. Within a predetermined period after the start of the process, the motor current value is actually measured when the same vacuum processing process is continuously performed for multiple substrates. A motor current value waveform obtained by multiple processes within the predetermined period and changing in chronological order is stored as the reference waveform. The predetermined period is a sufficient extra period in which there is no influence of an accumulated material in the process. This predetermined period is determined by experiment, or is experientially determined.

The reference waveform is, for example, (1) or (2) below.

(1) A signal waveform of a motor current value obtained when the same process (e.g., an etching process) is performed for each of multiple processing targets is defined as a unit waveform. Referring to FIG. 4, the signal waveform of the motor current value in the interval of the process P1 from the time point t1 to the time point t2 is the unit waveform. The reference waveform is a waveform group of N unit waveforms within the predetermined period in which the processes P1, P2, P3, . . . , PN are performed. As described above, the predetermined period is the period in which there is no influence due to the accumulated material.

(2) The N reference waveforms obtained within the above-described predetermined period are the substantially same pattern. Based on the N unit waveforms, a waveform having a single average signal pattern may be the reference waveform. Referring to FIG. 4, the average of signal patterns of three intervals between the time points t1, t2, the time points t2, t3, and the time points t3, t4 may be reference waveform, for example.

In description below, the reference waveform described in (1) above will be described as one to be compared with the actual measurement waveform.

The actual measurement waveform for which the degree of coincidence in pattern between the actual measurement waveform and the reference waveform is computed is a repeated pattern of the motor current value obtained within the predetermined period after generation of the reference waveform. The actual measurement waveform is compared with the reference waveform having multiple signal patterns as in (1) above. Alternatively, each of multiple unit waveforms of the actual measurement waveform is compared with the reference waveform of the unit waveform as the single signal pattern as in (2) above.

The pump monitoring section 24 of the first embodiment compares the shapes of the actual measurement waveform 41 and the reference waveform 42, and in a case where both waveforms are taken as the same waveform or similar waveforms, determines that there is no abnormality in the pump, i.e., the pump is normal. In a case where both waveforms are not taken as the same waveform or similar waveforms, it is determined that there is an abnormality in the pump.

Figure 5:
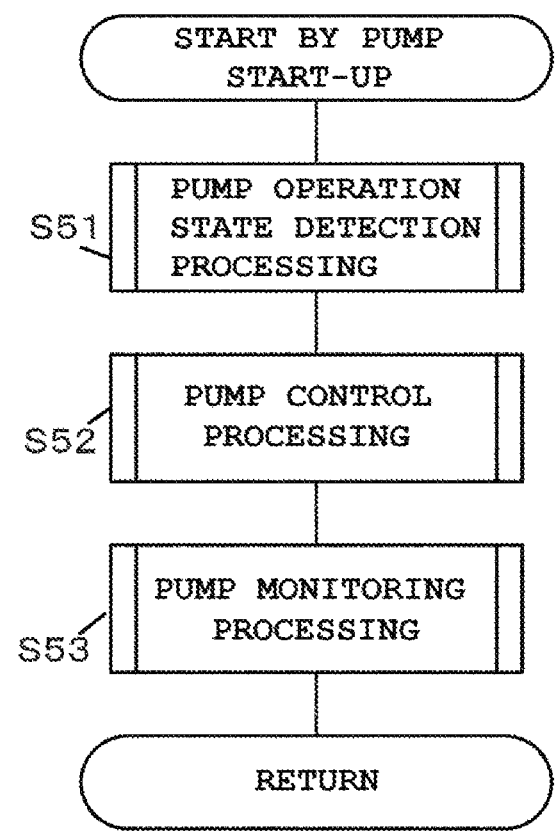
FIG. 5 is a flowchart of one example of a main flow of operation control processing of the vacuum pump.

FIG. 5 is a flowchart of a pump operation control procedure executed by the pump controller 12. This procedure is executed in such a manner that a program stored in the storage section 25 is activated upon pump start-up.

At a step S51, pump operation state detection processing is executed. In the first embodiment, the number of rotations of the rotor shaft 15, the value of motor current flowing in the motor 16, a motor voltage applied to the motor 16, the base temperature used for the control of preventing product accumulation and the like are detected. The number of rotations of the rotor shaft 15 is detected by the rotation number sensor 18 provided in the pump main body 11. The motor current value is detected by the motor control section 23 of the pump controller 12. The motor voltage is detected when the motor control section 23 controls the motor rotation number to the rated rotation number. The base temperature is detected by a temperature sensor placed at the base 60.

At a step S52, the pump control processing of controlling the number of rotations of the motor 16 and the base temperature to proper values by means of, e.g., the rotor rotation number, the motor current, the motor voltage, and the base temperature obtained at the step S51.

At a step S53, the pump monitoring processing of monitoring the presence or absence of the pump abnormal state is executed. Details of the pump monitoring processing will be described with reference to FIGS. 6 and 7.

Note that the pump control processing, e.g., motor rotation number control and stator temperature control are repeatedly performed. The pump monitoring processing of the step S53 is executed every time various types of control in the pump control processing of the step S52 ends once or after various types of control have been repeated multiple times. Thus, the steps S51 to S53 are repeatedly executed.

The details of the pump monitoring processing of the step S53 of FIG. 5 will be described with reference to FIGS. 6 and 7. At a step S1, after the pump rotation number has reached the rated rotation number, it is determined whether or not the reference waveform 42 has been already acquired. In the case of negative determination, the processing proceeds to a step S2. At the step S2, the motor current value is sampled at predetermined time intervals. At a step S3, it is determined whether or not the predetermined period has lapsed, and sampling of the motor current value is continuously performed until positive determination is made. The sampled motor current value is stored in the storage section 25.

In the case of positive determination at the step S3, the processing proceeds to a step S4, and time-series data of the motor current value stored in the storage section 25 is set as data of the reference waveform 42. The waveform 42 indicated by the dashed line of FIG. 4 is the reference waveform 42 of the motor current value acquired as described above.

At the step S1, in a case where it is determined that the reference waveform has been already acquired, the processing proceeds to a step S5.

At the subsequent step S5 of the step S4, the motor current value is sampled at the predetermined time intervals. At a step S6, it is determined whether or not the predetermined period has elapsed, and sampling of the motor current value is continuously performed until positive determination is made. The sampled motor current value is stored in the storage section 25. In the case of positive determination at the step S6, the processing proceeds to a step S7, and time-series data of the motor current value stored in the storage section 25 is set as data of the actual measurement waveform 41. The waveform 41 indicated by the solid line of FIG. 4 is the actual measurement waveform 41 of the motor current value acquired as described above. At a subsequent step S8 of the step S7, pump abnormality determination processing is executed.

Figure 7:
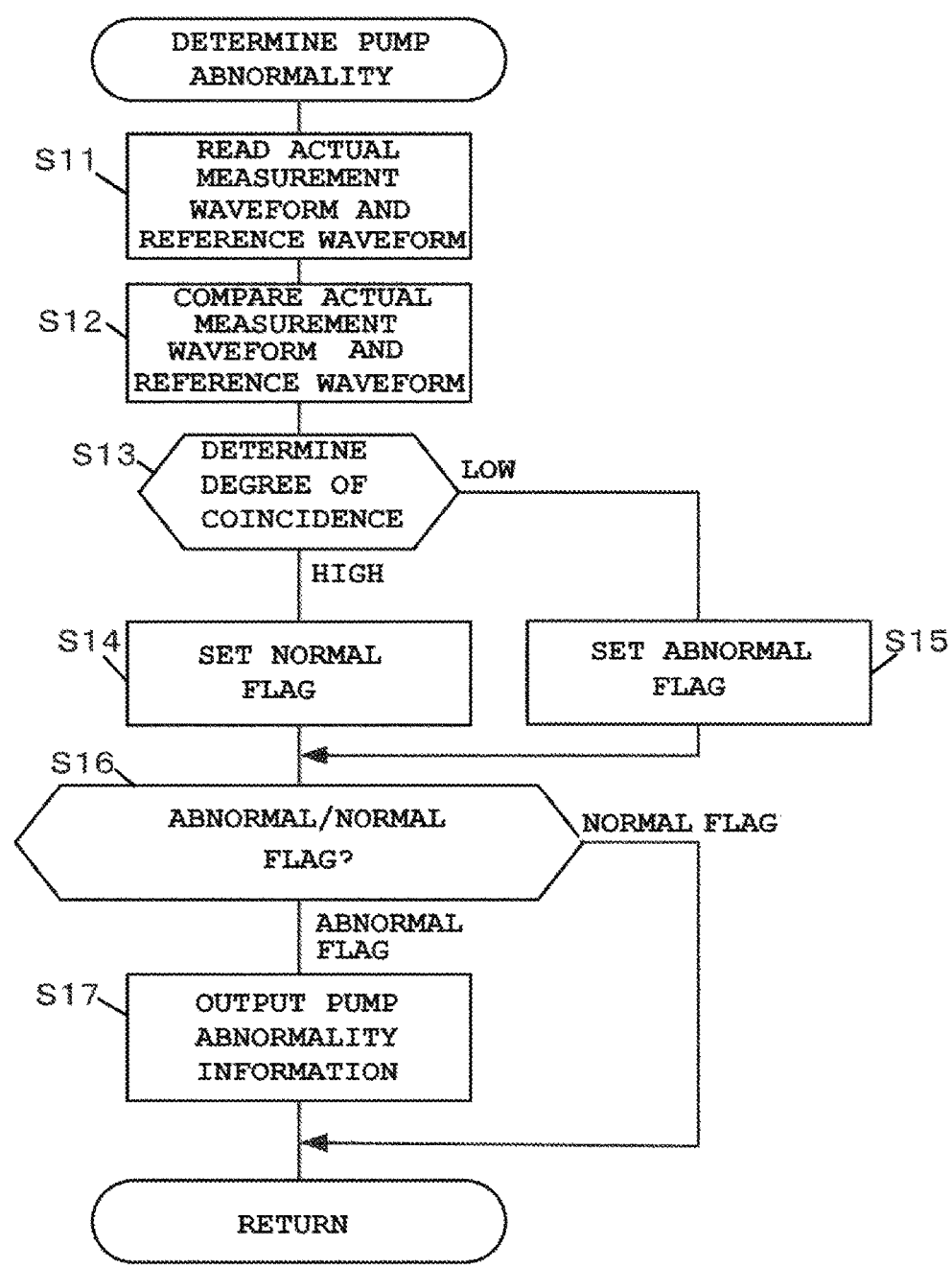
FIG. 7 is a flowchart of one example of abnormality determination processing.

FIG. 7 is a flowchart for describing the pump abnormality determination processing at the step S8. The pump abnormality determination processing is the processing of detecting the pump abnormal state by means of the acquired reference waveform 42 and the acquired actual measurement waveform 41.

At a step S11, the data of the reference waveform 42 and the data of the actual measurement waveform 41 stored in the storage section 25 are read. At a step S12, the processing of comparing the data of the reference waveform 42 and the data of the actual measurement waveform 41 is executed. At a step S13, the degree of coincidence between both waveforms is determined based on a comparison result of the comparison processing. In the case of the same waveform or similar waveforms, it is determined that both waveforms are coincident with each other, and a normal flag is set at a step S14. In the case of not the same waveform or similar waveforms, it is determined that both waveforms are not coincident with each other, and an abnormal flag is set at a step S15. At a step S16, the presence or absence of the abnormal/normal flag is determined, and if there is the abnormal flag, the processing proceeds to a step S17, and the pump abnormality is output. If there is the normal flag, the step S17 is skipped, and the processing returns to predetermined processing.

Figure 6:
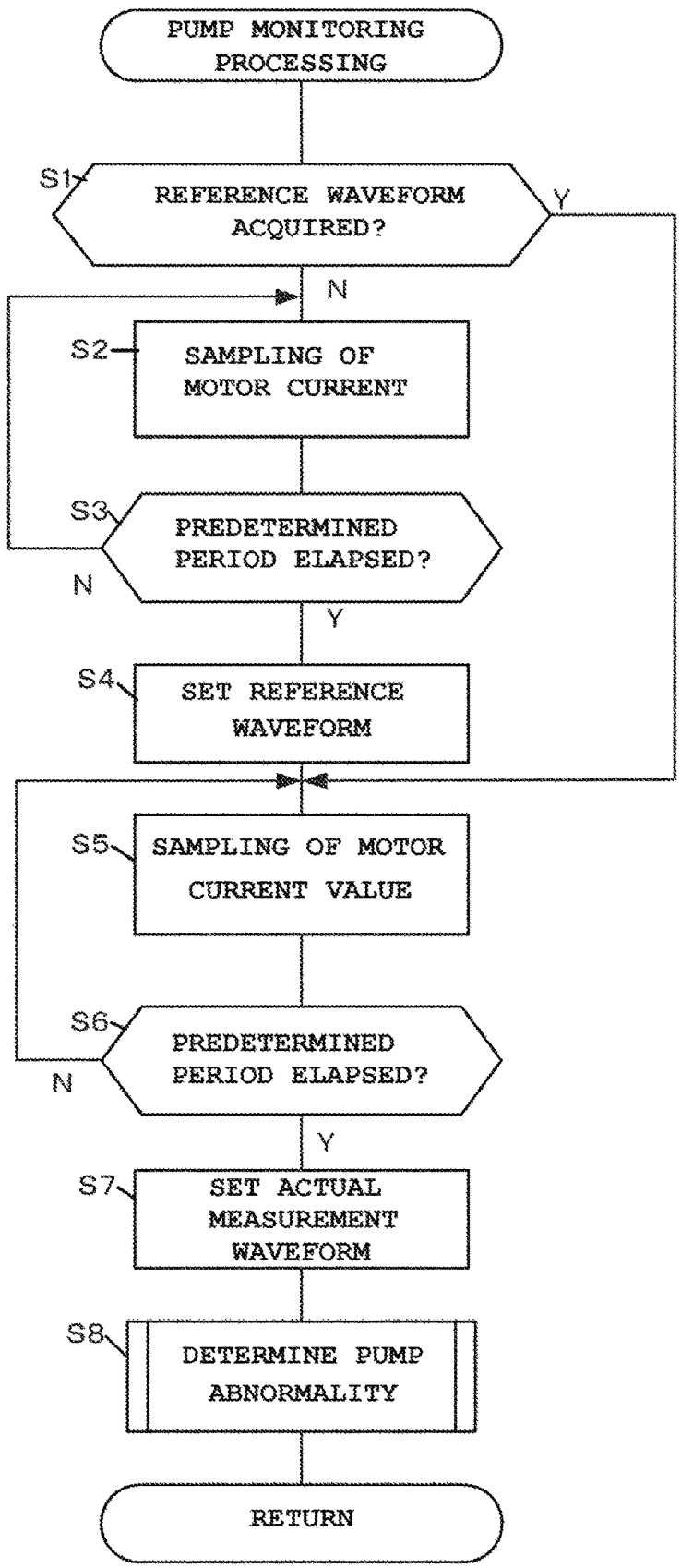
FIG. 6 is a flowchart of one example of pump monitoring processing in the first embodiment.

Pump abnormal state detection processing by program processing as illustrated in FIGS. 5 to 7 will be summarized as follows.

When a command for starting the vacuum pump 1 is input to the pump controller 12, the pump controller 12 performs motor control such that the rotor shaft 15 is rotated with the rated rotation number. That is, the pump controller 12 acquires a detection signal of the rotation number sensor 18, and the motor control section 23 controls the motor 16 such that the rotor shaft 15 is rotated with the rated rotation number. After the number of rotations of the rotor shaft 15 has reached the rated rotation number, a rotation number signal from the rotation number sensor 18 is subsequently acquired, and the motor control is performed such that the rotor shaft 15 is rotated with the rated rotation number.

After the rotor shaft 15 has been rotated with the rated rotation number, the process for the processing target such as the substrate begins. Until the predetermined period elapses after the start of the process, influence on the motor control due to the accumulated material is small. The chronologically-changing waveform of the motor current acquired during the predetermined period is stored as the reference waveform 42. After the reference waveform has been acquired, the chronologically-changing waveform of the motor current is subsequently stored as the actual measurement waveform 41. The reference waveform 42 and the actual measurement waveform 41 are compared for detecting the pump abnormal state. Waveform comparison is performed by computation of the degree of coincidence between both waveforms by a pattern matching method. For example, the degree of coincidence is compared with a predetermined threshold. The normal state is determined if the degree is higher than the threshold, and the abnormal state is determined if the degree is lower than the threshold. If the degree of coincidence is high, the normal flag indicating no abnormality is set. If the degree of coincidence is low, the abnormal flag indicating the abnormality is set. The pump controller 12 outputs the pump abnormal state to the main controller 100 based on the abnormal flag.

Figure 8A:
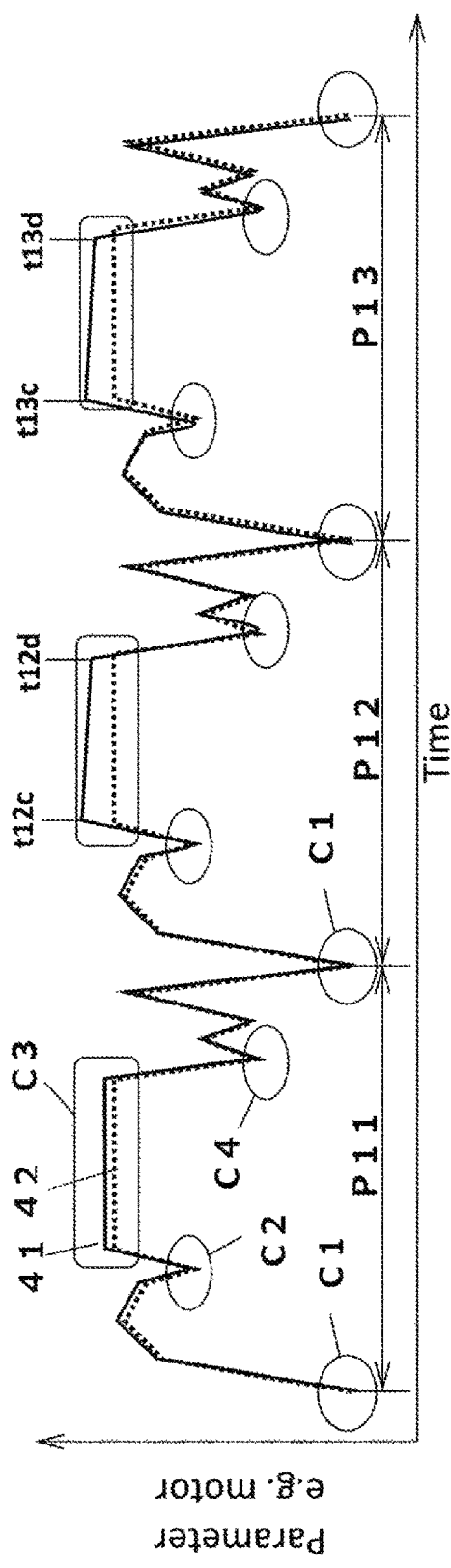
FIGS. 8A and 8B are graphs of the actual measurement waveform and the reference waveform of the motor current value.
Figure 8B:
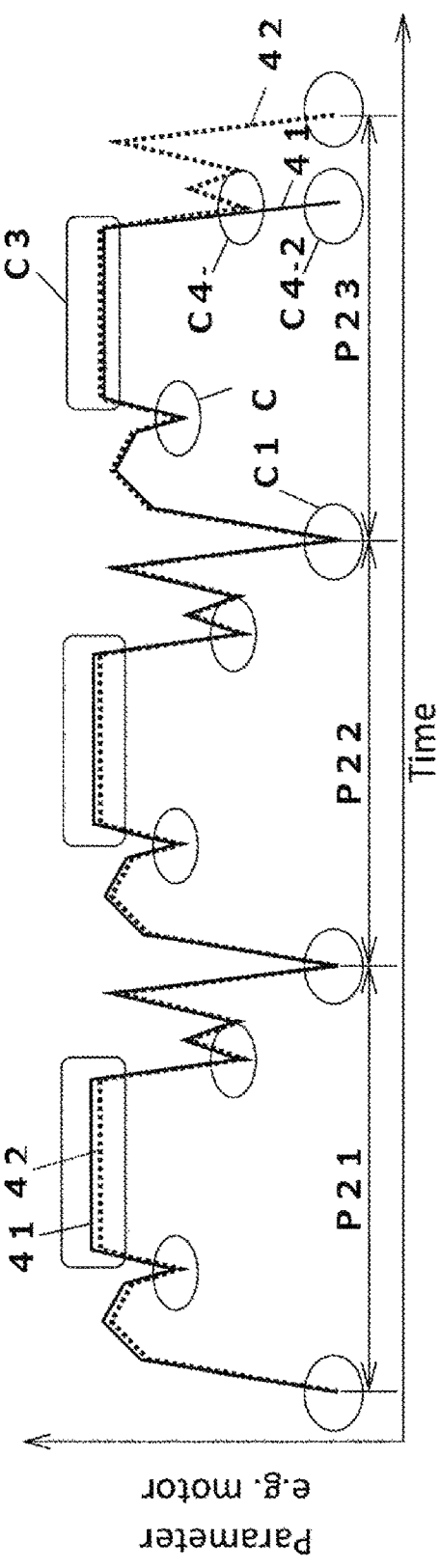

In FIG. 4, the reference waveform 42 and the actual measurement waveform 41 are substantially coincident with each other in the processes P1 to P3, and this indicates that the vacuum pump is normal. FIGS. 8A and 8B illustrate time-series motor current waveforms similar to that of FIG. 4 in processes P11 to P13 and processes P21 to P23.

In the current value waveform illustrated in FIG. 8A, a difference between the actual measurement waveform 41 and the reference waveform 42 is small across the entire interval in the process P11. Thus, the degree of coincidence between the waveforms in the process P11 is high, and it is determined that the vacuum pump is normal. The difference between the actual measurement waveform 41 and the reference waveform 42 at an interval between time points t12c to t12d in the process P12 is great, the degree of coincidence between the waveforms in the process P12 is low. The abnormality of the vacuum pump is determined in the process P12. It is assumed that this is because the pump load is increased due to the accumulated material.

The actual measurement waveform 41 at an interval between time points t13c to t13d in the process P13 is also similar to the actual measurement waveform 41 in the process P12.

Oval regions C1, C2, C3, C4 of FIG. 8A are regions for computing the difference between the actual measurement waveform and the reference waveform when the degree of coincidence in a current value waveform pattern is calculated. Actually, the actual measurement waveform and the reference waveform are acquired in such a manner that the current value within the predetermined duration set in each region of each process is sampled at the predetermined time intervals. The difference between these waveforms is computed within the difference computation region. A greater difference within the predetermined duration results in a smaller value provided to a point used for coincidence degree computation. The degree of coincidence between the waveforms is determined based on the total of the coincidence degree computation points computed in each region. A greater sum of the points results in a higher degree of coincidence.

Pattern matching computation is not limited to the above-described example, and various other methods may be employed.

In the current value waveform illustrated in FIG. 8B, the difference between the actual measurement waveform 41 and the reference waveform 42 in the processes P21, P22 is small. Thus, the degree of coincidence in the waveform pattern is high, and it is determined that the pump is normal. However, in the process P23, the waveforms in regions C4-1, C4-2 are greatly different from each other, and therefore, the total of the computed differences within this duration is great. Thus, the degree of coincidence between the waveforms in the process P23 is low, and it is determined that the pump is abnormal.

Operation of the pump monitoring device in the first embodiment described above will be summarized as follows.

(1) The pump monitoring device is the monitoring device of the vacuum pump 1 configured to perform exhaust for the process chamber 2 in which various processes are performed for the substrate as the processing target. The pump monitoring device includes the acquisition section 24a configured to acquire the motor current value as the physical amount indicating the operation state of the vacuum pump 1, the comparison section 24d configured to compare the actual measurement waveform 41 and the reference waveform 42 of the motor current value, and the determination section 24e configured to determine the abnormality due to an increase in the load of the vacuum pump 1 based on the comparison result of the comparison section 24d.

Thus, as compared to a typical technique in which a current value of a motor configured to rotatably drive a rotor of a vacuum pump is measured and an alert is issued in a case where the amount of change in a measurement value with respect to an initial motor current value is equal to or greater than a predetermined value, the opportunity of erroneously informing the alert can be reduced.

(2) The setting section 24b of the pump monitoring device acquires and sets, as the reference waveform 42, the signal waveform of the motor current value within the predetermined time after the vacuum pump 1 has been started and has reached the rated rotation number.

With this configuration, when the vacuum pump 1 is started, i.e., when the predetermined period has elapsed after the start of the process, the reference waveform 42 is set, and therefore, a useless step only for setting the reference waveform can be omitted.

Second Embodiment

In the first embodiment, the reference waveform and the actual measurement waveform are compared for the single process (e.g., the etching process) for monitoring the abnormality of the pump. In a second embodiment, a reference waveform is acquired for two or more processes such as two different types of etching processes, and the reference waveform unique to each process and an actual measurement waveform are compared with each other for monitoring a pump abnormality. For example, in two different etching processes, a motor current value waveform at one interval in the process varies. Thus, for accurately performing pattern matching, the reference waveform needs to be changed for each process.

Figure 9:
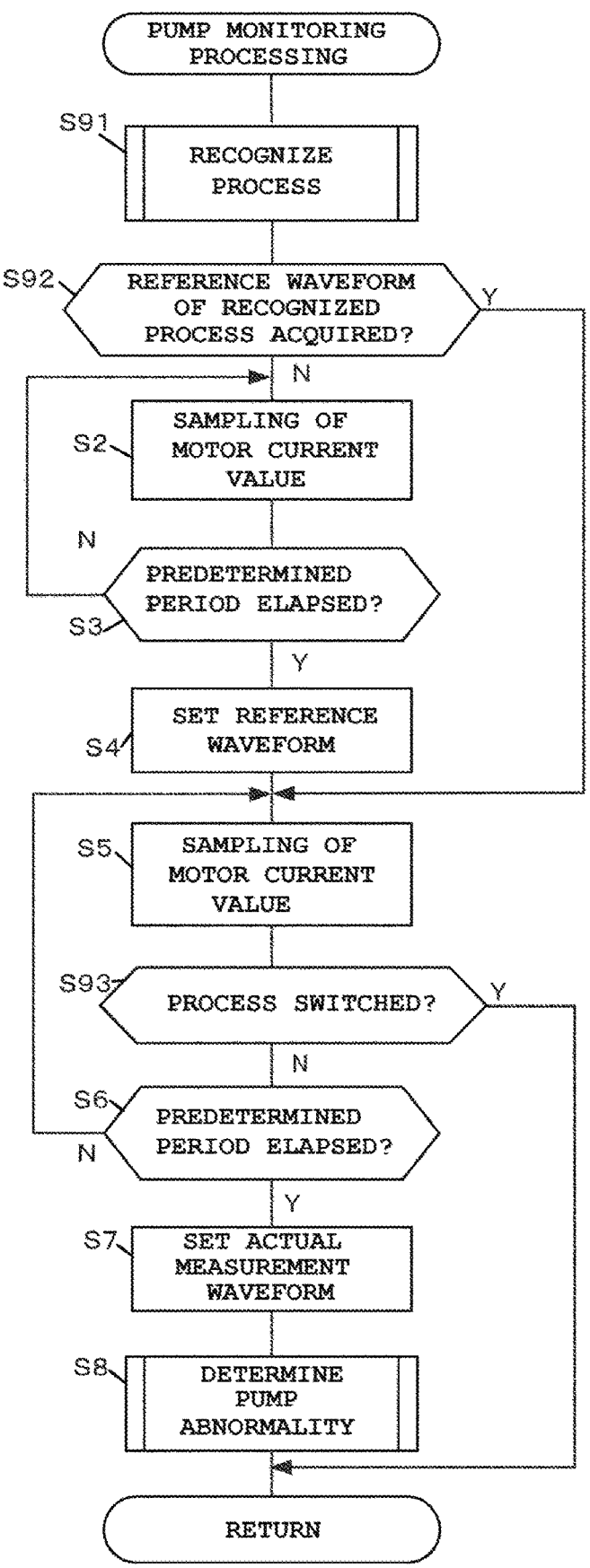
FIG. 9 is a flowchart of one example of pump monitoring processing in a second embodiment.

FIG. 9 is a flowchart of details of pump monitoring processing of a step S53 of FIG. 5 in the second embodiment. Similar reference numerals are used to represent contents similar to those of FIG. 6 of the first embodiment, and differences will be mainly described.

At a step S91, a process performed in a vacuum processing device 10 is recognized. Thereafter, at a step S92, it is determined whether or not the reference waveform in the recognized process has been already acquired. If not, a motor current value is repeatedly sampled within a predetermined period as described above at steps S2 to S4, and the reference waveform in the recognized process is set. Thereafter, sampling of the motor current value is performed at a step S5. At a step S93, it is determined whether or not the process has been switched within the predetermined period.

When switching of the process is not determined at the step S93, the actual measurement waveform is stored and saved until the predetermined period ends at a step S6. Thereafter, the actual measurement waveform is set at a step S7, and pump abnormality determination is performed at a step S8.

At the step S93, when it is determined that the process has been switched within the predetermined period, setting of the actual measurement waveform in the process at the step S7 and the step S8 by comparison between the actual measurement waveform and the reference waveform are skipped, and return processing is performed.

Process recognition at the step S91 can be performed as follows.

For example, in two different etching processes, a single unit processing time of the process varies. Referring to FIG. 4, the unit processing time is an interval between time points t1 to t2. An interval for a single pattern of the motor current value is monitored so that the point of changing the interval can be recognized as switching of the process.

Alternatively, when one etching process is switched to another etching process, cleaning processing is performed. By recognition of such cleaning processing, switching from one etching process to another etching process may be recognized for recognizing process switching.

Alternatively, a vacuum processing recipe is obtained from a main controller 100 of the vacuum processing device 10 by a pump controller 12 so that the reference waveform can be switched according to the recipe.

In a pump monitoring device of the second embodiment, the process which is being performed is recognized among multiple types of processes performed in the vacuum processing device 10. The reference waveform in such a process is acquired, and the reference waveform and the actual measurement waveform are compared with each other for calculating the degree of coincidence between the waveforms. It is determined as normal (no abnormality) when the degree of coincidence is high, and it is determined as abnormal when the degree of coincidence is low.

The pump monitoring device of the second embodiment as described above will be summarized as follows.

(3) Setting sections 24b, 24c of the pump monitoring device sets the reference waveform 42 and the actual measurement waveform 41 for each process, and a comparison section 24d compares the reference waveform 42 corresponding to the process and the actual measurement waveform 41. In other words, the reference waveform 42 selected for each process is compared with the actual measurement waveform 41.

With this configuration, the reference waveform properly selected for each of multiple types of processes performed by the vacuum processing device 10 and the actual measurement waveform are compared so that the pump abnormality can be determined. As a result, the abnormality of the vacuum pump 1 due to an accumulated material can be determined with high accuracy.

(First Variation)

As illustrated in FIGS. 4, 8A, and 8B, in the first and second embodiments, pattern matching between the reference waveform 42 and the actual measurement waveform 41 is performed for the waveform of the motor current value across the entirety of the single step of the same process (e.g., the interval of the process P1 of FIG. 4) to determine the pump abnormality. However, pattern matching may be, for example, performed only for the reference waveform and the actual measurement waveform within the duration in the region C3 of FIG. 8A to determine the abnormality.

That is, in a pump monitoring device of a first variation, the duration C3 in which the physical amount such as the motor current value is maximum is focused in the single process. The comparison section 24d computes a difference in the motor current value at each time point for sampling the actual measurement waveform 41 and the reference waveform 42 in the duration C3, and determines the degree of coincidence based on the sum of the differences.

Thus, as compared to a case where pattern matching is performed across the entirety of the single step in the same process, an abnormality determination algorithm is simplified. Thus, cost reduction can be realized while determination time can be shortened.

(Second Variation)

A pump monitoring device of a second variation calculates the average of the current values within the region of the first variation, i.e., within the duration in the region C3 in which the motor current value is maximum, for the actual measurement waveform 41 and the reference waveform 42. The pump monitoring device determines as a pump abnormal state when a difference between the averages is equal to or greater than a predetermined threshold, and determines as a normal state when the difference is smaller than the predetermined threshold. That is, the comparison section 24d in the pump monitoring device of the second variation calculates the average of the motor current values for each of the actual measurement waveform 41 and the reference waveform 42 in the region C3 in which the motor current value is maximum, and computes the difference between the averages to perform waveform comparison.

When the motor is driven with the maximum current value, the increase rate of the load due to the accumulated material is higher than the case of driving the motor with a small current value. Thus, the pump abnormality can be accurately monitored.

(Third Variation)

In a pump monitoring device of a third variation, pump abnormality determination may be performed using the current value waveforms in any two or more of the regions C1 to C4 of FIG. 8A.

(Fourth Variation)

A pump abnormality determination algorithm using the average by the pump monitoring device of the second variation and a pump abnormality determination algorithm using pattern matching in the first and second embodiments may be combined to determine the pump abnormality.

(Fifth Variation)

The pump abnormality is not determined using the motor current value, but may be determined using, e.g., the motor rotation number or a control current value in magnetic bearing control. These physical amounts can be utilized as indicators of the pump load due to the accumulated material.

(Sixth Variation)

In the first and second embodiments and the variations, the time-series motor current value within the predetermined period after the vacuum pump 1 has reached the rated rotation number is set as the reference waveform. The reference waveform may be set in advance for each process before the start of the process, and the reference waveform corresponding to the process may be read.

An increase in the pump load due to, e.g., adherence of an impurity component of process gas to the rotor has been described above as one example. However, the device configured to monitor the pump abnormality due to a pump load increase from comparison between the reference waveform and the actual measurement waveform as in the present invention is not limited to the accumulated material as a cause for an abnormal pump load increase, and may be used for monitoring the pump abnormality caused by a pump load increase due to other causes.

Various embodiments have been described above, but the present invention is not limited to the contents of these embodiments. Other aspects conceivable within the scope of the technical idea of the present invention are also included in the scope of the present invention. Moreover, multiple embodiments may be combined.

What is claimed is:

1. A vacuum pump for performing exhaust for a process chamber in which various processes are performed for a processing target, comprising:
    a pump main body including a rotor, a stator, and a motor configured to rotatably drive the rotor; and
    a pump controller including a pump monitoring device and configured to drivably control the motor, wherein the pump monitoring device comprises a control circuit including:
    an acquisition section configured to, after a rotation number of a rotor of the vacuum pump has reached a rated rotation number, acquire a physical amount representing an operation state of the vacuum pump over a first period of time to set a waveform of the acquired physical amount as a reference waveform, and over a second period of time later than the first period of time to set an actual measurement waveform of the physical amount;
    a comparison section configured to compare the actual measurement waveform of the physical amount with the reference waveform of the physical amount by calculating a difference between a value of the actual measurement waveform and a value of the reference waveform at multiple different corresponding time points only in a difference computing region that is only a part of the actual measurement waveform and the reference waveform to determine a degree of coincidence between the actual measurement waveform and the reference waveform;

a determination section configured to determine an abnormality due to an increase of reactive product in the vacuum pump based on the degree of coincidence determined by the comparison section; and a notification section to automatically output an indicia of abnormality based on a determination of the determination section.

2. The vacuum pump according to claim 1, wherein the comparison section compares the reference waveform selected for each process with the actual measurement waveform.

3. The vacuum pump according to claim 1, wherein the reference waveform is acquired based on a signal waveform of the physical amount within a predetermined period after the vacuum pump has been started.

4. The vacuum pump according to claim 1, wherein the comparison section calculates, for each of the actual measurement waveform and the reference waveform within a duration in which the physical amount is maximum in a single process, an average of the physical amount for the actual measurement waveform and the reference waveform, and computes the difference between the value of the actual measurement waveform and the value of the reference waveform by computing a difference between the averages to perform a waveform comparison.

5. The vacuum pump according to claim 1, wherein a signal waveform of the physical amount obtained when an identical process is continuously performed for multiple processing targets is defined as a unit waveform, each of the reference waveform and the actual measurement waveform includes multiple unit waveforms repeated within a predetermined period, and the comparison section compares the reference waveform and the actual measurement waveform each including the multiple unit waveforms.

6. The vacuum pump according to claim 1, wherein the physical amount is a current value of the motor configured to rotatably drive the rotor of the vacuum pump.

7. The vacuum pump according to claim 1, wherein the acquisition section acquires the physical amount by sampling the physical amount at predetermined time intervals corresponding to the computing region; and the comparison section compares the actual measurement waveform of the physical amount with the reference waveform of the physical amount by comparing portions of the actual measurement waveform of the physical amount and the reference waveform of the physical amount directly corresponding to the sampled physical amount within the computing region and determine the degree of coincidence between the actual measurement waveform and the reference waveform.

8. The vacuum pump according to claim 1, wherein the determination section determines the abnormality by comparing the degree of coincidence with a predetermined threshold.

9. The pump monitoring device according to claim 1, wherein in the difference computing region, the comparison section determines coincidence degree computation points used in the determination of the degree of coincidence based on a difference and determines the degree of coincidence based on a sum of the coincidence degree computation points.

* * * * *